(12) United States Patent
Erickson et al.

(10) Patent No.: US 12,386,551 B2
(45) Date of Patent: Aug. 12, 2025

(54) LOW OVERHEAD PAGE RECOMPRESSION

(71) Applicant: Rambus Inc., San Jose, CA (US)

(72) Inventors: Evan Lawrence Erickson, Chapel Hill, NC (US); Christopher Haywood, Fernandina Beach, FL (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/540,670

(22) Filed: Dec. 14, 2023

(65) Prior Publication Data

US 2024/0201894 A1    Jun. 20, 2024

Related U.S. Application Data

(60) Provisional application No. 63/387,628, filed on Dec. 15, 2022.

(51) Int. Cl.
*G06F 3/06* (2006.01)

(52) U.S. Cl.
CPC .......... *G06F 3/0656* (2013.01); *G06F 3/0604* (2013.01); *G06F 3/064* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,991,515 A | * | 11/1999 | Fall ............... G06K 15/1851 382/233 |
| 6,349,372 B1 | | 2/2002 | Benveniste et al. |
| 6,779,088 B1 | | 8/2004 | Benveniste et al. |
| 7,636,810 B2 | | 12/2009 | Ramakrishnan |
| 7,984,240 B2 | | 7/2011 | Borkenhagen |
| 9,575,681 B1 | * | 2/2017 | Fisher ............... G06F 3/0688 |
| 9,696,910 B2 | | 7/2017 | Manning et al. |

FOREIGN PATENT DOCUMENTS

| | | | | |
|---|---|---|---|---|
| CN | 107924350 A | * | 4/2018 | ............ G06F 11/14 |
| CN | 113885787 A | * | 1/2022 | |
| WO | WO-2008138042 A1 | * | 11/2008 | ....... G06F 17/30492 |

* cited by examiner

*Primary Examiner* — Brian R Peugh
(74) *Attorney, Agent, or Firm* — Womble Bond Dickinson (US) LLP

(57) ABSTRACT

An apparatus and method for low page overhead recompression. In one embodiment a memory buffer integrated circuit (IC) device is disclosed that includes a first circuit configured to independently compress equally sized portions of a page of data, and a second circuit configured to store the compressed data portions at respective addresses in memory. The memory buffer IC device also includes a third circuit configured to store a page table comprising an entry with information related to the respective memory addresses.

19 Claims, 7 Drawing Sheets

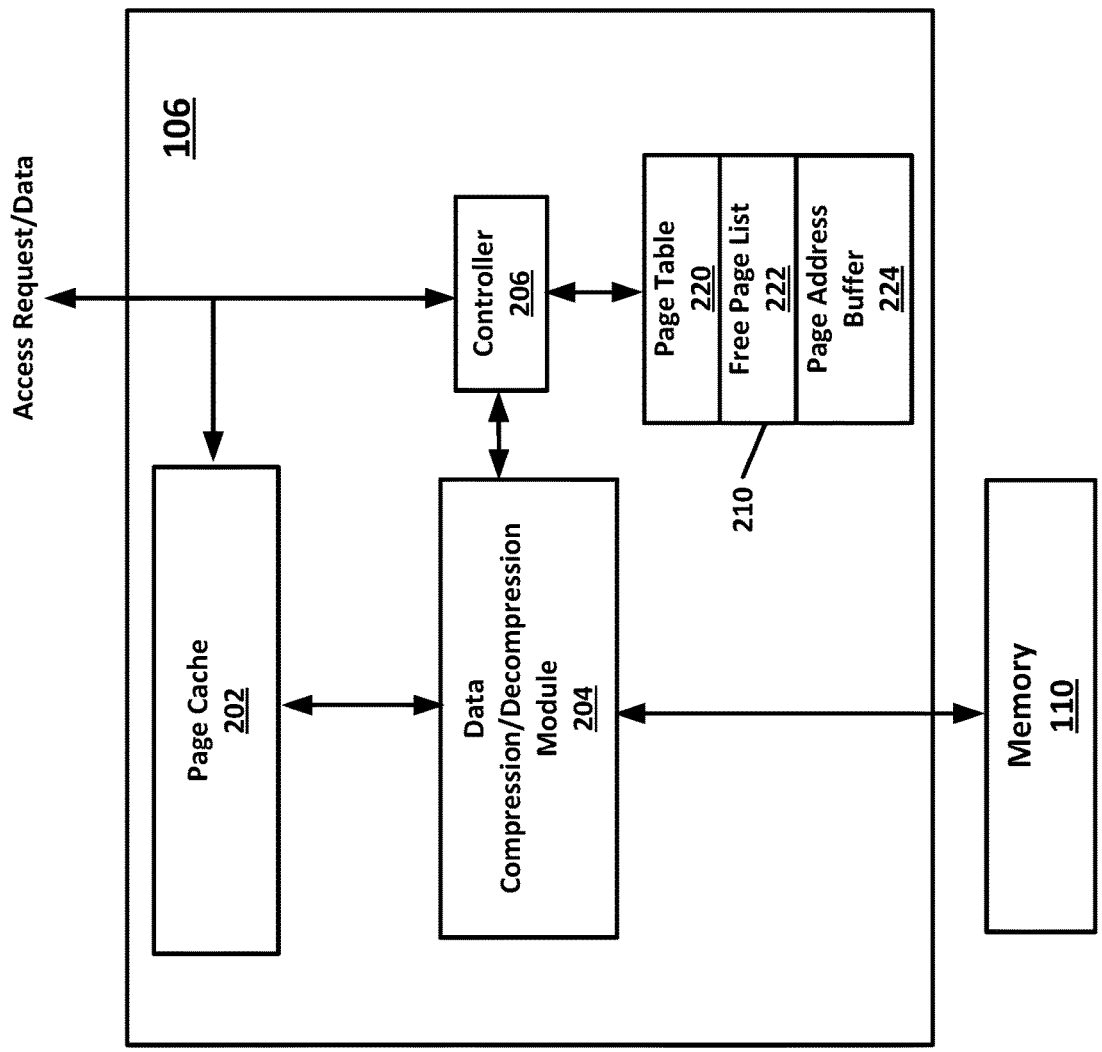

LOW OVERHEAD PAGE RECOMPRESSION

CROSS-REFERENCE TO RELATED APPLICATIONS

This application claims the benefit of U.S. Provisional Patent Application No. 63/387,628, filed on Dec. 15, 2022, which is hereby incorporated by reference in its entirety.

BACKGROUND

A memory page is a fixed-length contiguous block of memory, described by a single entry in the page table. A transfer of pages between main memory and an auxiliary store, such as a page cache, is referred to as paging or swapping. Some memory systems store pages in compressed format. Before a page can be transferred back from cache to main memory in these systems, the page should be compressed or recompressed using a computationally intensive algorithm such as Zstandard (Zstd).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1 is a block diagram that illustrates relevant components of an example data processing system employing one embodiment of the present disclosure.

FIG. 2 is a block diagram that illustrates one example of a buffer device employed in the system of FIG. 1.

DETAILED DESCRIPTION

Figure 3:
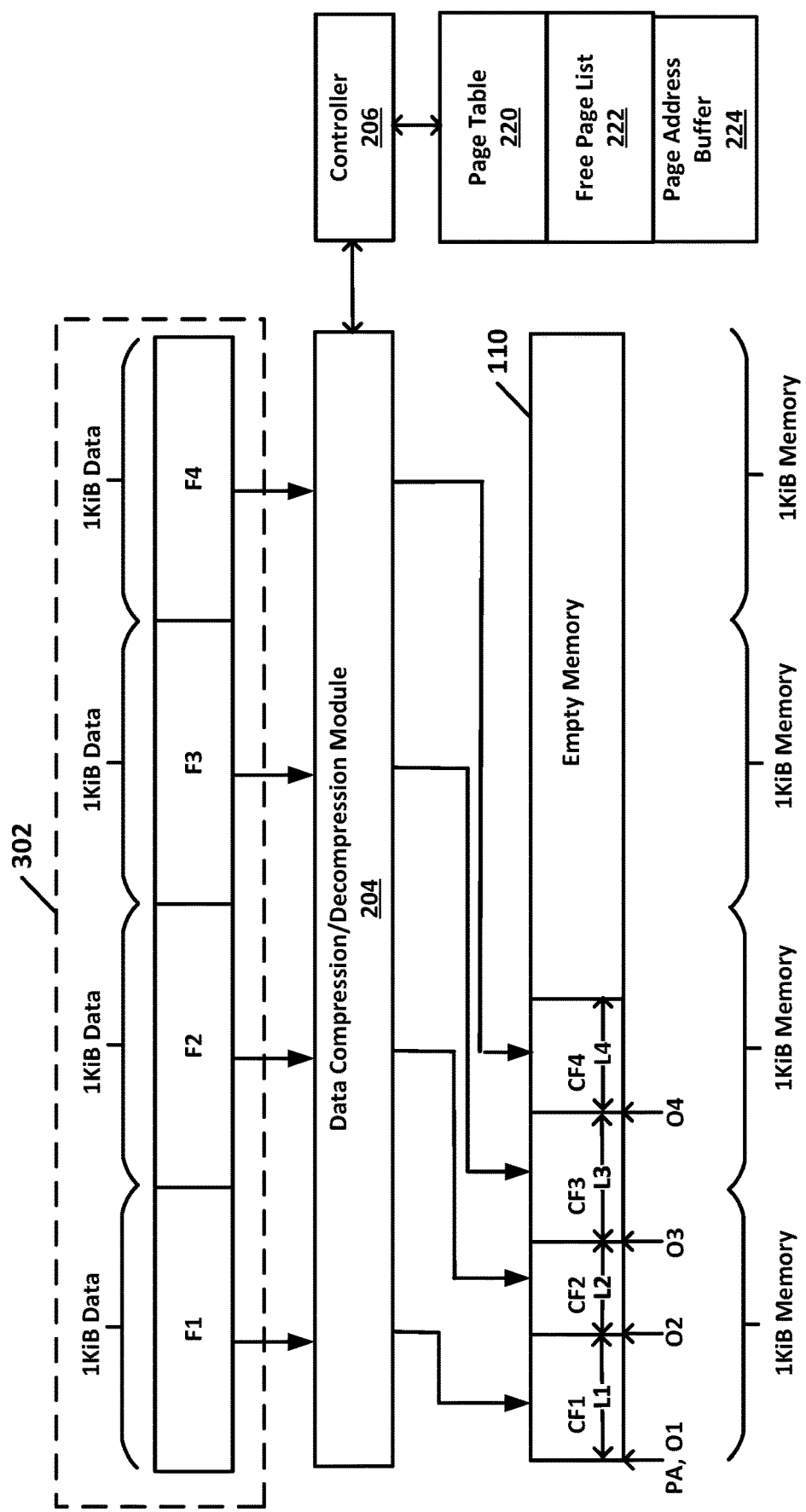
FIG. 3 is a block diagram illustrating relevant aspects of compressing a page of data according to one embodiment of the present disclosure.

In the following description, various aspects of the illustrative embodiments will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations are set forth to provide a thorough understanding of the illustrative embodiments. In other instances, well-known features are omitted or simplified in order not to obscure the illustrative embodiments.

In data computing a cache is an auxiliary memory device from which high-speed data retrieval is possible. Caches store data so that future requests for data can be served faster; the data stored in a cache might be the result of an earlier computation or a copy of data stored in slower dynamic random-access memory (DRAM). A cache hit occurs when requested data can be found in the cache, while a cache miss occurs when it cannot. Hits are served by reading data from the cache, which is faster than reading from slower DRAM; thus, the more requests that can be served from the cache, the faster the system performs.

Caches can take any one of many configurations. Page caches are configured for storing copies of data pages held in memory. Page caches have proven themselves in many areas of data computing because typical computer applications access data with a high degree of locality of reference. Such access patterns exhibit temporal locality, where data is requested that has been recently requested already, and spatial locality, where data is requested that is stored physically close to data that has already been requested.

Pages can be stored in compressed format in memory to free space for other uses. Data compression is a process of reducing the amount of data needed for storage or transmission of a given piece of information, typically using encoding algorithms. Today, there are many different types of encoding algorithms. Lossless compression reduces a page's size without removing any bits of information. Lossless compression format works by removing redundancies within page data to reduce the overall size. With lossless compression, it is possible to perfectly reconstruct the original page through decompression.

Data decompression (the reverse of compression) is required in almost all cases of compressed data, including lossless compression. Like compression, decompression of data is also based on different algorithms. Decompression is considered important, as compressed data needs to be restored back to standard state for use by a requesting application. In the past, any access, however small, to a compressed page results in that page's decompression in its entirety. To illustrate, a page is compressed and stored in a memory system using any one of many different types of compression algorithms. When an application, which can be executing on a host computer system, requests access (read/write or load/store) to data of a compressed page, the compressed page is first decompressed in its entirety and stored in a page cache. The requested data is then returned to the application from the page cache. Eventually, the page held in cache is swapped with a new page. Before the swap occurs, the page contained within the page cache is typically recompressed before it is stored in memory system.

Recompression can slow the operation of a data computing. Disclosed is an apparatus and method for low overhead page recompression. FIG. 1 is a block diagram that illustrates relevant components of an example data processing system 100 employing one embodiment of the present disclosure. More specifically, system 100 includes a host computer system (host) 102 in data communication with a memory system 104 via a network 108. For ease of illustration and explanation FIG. 1 shows only one host 102, it being understood that network 108 may couple multiple hosts to memory system 104. Host 102 can implement one or more software applications that generate requests to access data in memory system 104.

Memory system 104 includes a buffer device 106 in data communication with memory 110 via link 112. Buffer device 106 may take form in one integrated circuit (IC) or several ICs in data communication with each other. For purposes of explanation only, buffer device 106 is presumed to be a single IC, it being understood the present disclosure should not be limited thereto. A buffer device manages the flow of data going to and from memory. A buffer device can be integrated into a memory module along with memory such as memory 110. Buffer device 106 and memory link 112 may communicate with each via data link 112 using any one of many different memory interfaces such as the double data rate interface (e.g., DDR4 or DDR5).

Memory 110 can be accessed by on a cache line (64B) basis. Cache lines are grouped (e.g., 64 cache lines) as pages of data (e.g., 4 KiB) in memory 110. Memory 110 can store pages in compressed, partially compressed, or uncompressed format. As will be more fully described below, memory 110 can store compressed, equally sized "frames" (i.e., portions) of a page. Compressed frames of a page can be stored contiguously in memory 110. Compressed frames can be stored with empty expansion memory spaces between them. Memory 110 can be structured in equally sized (e.g., 1 KiB) "slots." Each slot can store one or more compressed frames of a page or a portion of a compressed frame that spans across multiple slots.

In operation, buffer device 106 receives requests to access data from host 102. The requests should include addresses for the requested data. When buffer device 106 receives a request to access (e.g., read or load) data, buffer device 106 may translate the data address of the request into a corresponding data address in the address space for memory 110. Buffer device 106 can use the translated address to identify the memory location of a page that contains a frame, which contains a 64B data cache line, which in turn contains the requested data. If the identified page or frame thereof is compressed, buffer device 106 can decompress it, and store the decompressed page or frame in a cache (not shown in FIG. 1) or other memory device such as a temporary buffer. The present disclosure will be described with reference to storing decompressed data in a page cache, it being understood the present invention should not be limited thereto. The page cache may previously store a page when buffer device 106 receives the aforementioned access request. The previous page may need to be returned to memory to make room in the cache for the page containing the requested data. Before the previous page is returned to memory 110, buffer device 106 can recompress it or a frame thereof if data of the page or frame was modified while it was held in the page cache. Optionally, the previous page or frame can be returned to memory 110 in decompressed form.

FIG. 2 is a block diagram illustrating relevant components of an example buffer device 106 according to one embodiment of the present disclosure. Buffer device 106 includes a page cache 202 in data communication with data compression/decompression (C/D) module 204, buffer device controller 206, and host 102 (not shown in FIG. 2). Controller 206 manages the flow of data between page cache 202, C/D module 204 and memory 110 in accordance with one or more embodiments of the present disclosure.

Page cache 202 can hold at least one page of data. A smaller page cache 202 can store at least one frame (1 KiB) of data. Unless otherwise noted, page cache 202 is configured to store a page (4 KiB) of data. Page cache 202 can respond to access requests that are received from host 102. For example, page cache 202 can respond by returning data requested by host 102. Although not shown in FIG. 2, page cache 202 may include a page cache table and a page controller. The page cache table comprises entries for respective cache lines of a page held in page cache 202. Each entry contains information indicating whether a respective cache line is "dirty" (i.e., modified while held in the page cache).

C/D module 204 can compress, recompress or decompress a page of data in whole or in part (e.g., frame). For example, C/D module 204 can independently and concurrently compress or recompress equally sized frames of a page, such as a page held in page cache 202, prior to storing the compressed or recompressed frames in memory 110. Unless otherwise noted, a 4 KiB page of data can be fully compressed to fit within two 1 KiB slots of memory 110. Infrequently accessed pages may be stored in memory 110 in decompressed form. To free up space in memory 110, C/D module 204 can receive frames of an infrequently accessed page that is stored in decompressed form, compress the frames, and return the compressed frames to memory 110 without having to involve page cache 202. Further C/D module 204 can decompress frames of a compressed page held in memory 110, for subsequent storage in page cache 202 or other device.

Buffer device controller 206 is in data communication with local memory 210, which includes a page table 220, a free page list 222, and a page address buffer 224. Page table 220 may include an entry for each fully or partially compressed page stored in memory 110. Page table 220 may also include entries that include a starting address and length of respective regions of memory 110 that aren't compressed.

As noted an entry in table 220 can describe a fully or partially compressed page. The entry may include the starting address of a fully or partially compressed page in memory 110. The starting address should align with a slot in memory 110. An entry may indicate whether its corresponding page is partially or fully compressed. An entry may include an offset from the starting address for each compressed frame of its page. An entry may include a data length for each compressed frame of its page. Compressed data can be stored in memory 110, either contiguously or with unused (i.e., empty) spaces between compressed page frames. The empty spaces enable expansion of compressed frames as will be more fully described below. Or the empty spaces enable cache line alignment of compressed frames in memory 110. An entry may include the length of expansion memory space that is contiguous with a compressed frame of a page. Alternatively, an entry may simply include a starting address for the fully or partially compressed page in memory 110, and the frame offsets, frame data lengths, expansion space lengths, etc., can be stored in memory 110 as compressed or uncompressed page metadata. For purposes of explanation, the present disclosure will be described with table entries that describe fully or partially compressed frames including their frame offsets, frame data lengths, expansion space lengths, etc.

Free page list 222 identifies the starting addresses in memory 110 that are available to store a compressed page of data, a partially compressed page of data, or a page of data that is not compressed at all. Page address buffer 224 can store page starting addresses copied by controller 206 from entries of page table 220.

FIG. 3 illustrates operational aspects of compressing and storing a page of data according to one embodiment of the present disclosure. In this embodiment, a page 302 of data is divided into equally sized frames. FIG. 3 shows four equally sized (e.g., 1 KiB) frames F1-F4, it being understood fewer or more equally sized frames can be used in an alternative embodiment. C/D module 204 can receive the equally sized frames. C/D module 204 can compress frames F1-F4 in parallel as shown. When operating in reverse, C/D module 204 can decompress frames held in memory 110. All frames may be compressed (or decompressed) by C/D module 204 using the same compression/decompression dictionary. Frames can be compressed or decompressed independently from each other. In other words, each frame can be compressed separately, and therefore decompressed separately. Compressed frames CF1-CF4 can be stored contiguously in two adjacent 1 KiB slots of memory 110 as shown in FIG. 3 so that no unused or empty memory is between CF1-CF4. In an alternative embodiment, compressed frames CF1-CF4 can be stored next to each other with small empty spaces between them to enable cache line alignment. Although not shown in FIG. 3, controller 206 creates an entry in table 224 for compressed page 302. Controller 206 updates the entry by storing the starting address PA of the compressed frame, the offsets O1-O4 from the starting address for compressed frames CF1-CF4, respectively, data lengths L1-L4 for compressed frames CF1-CF4, respectively, and an indication that the page is fully compressed. Ideally, PA is cache line aligned in memory 110. Offset O1 is presumed to be zero. The other offsets may be cache line aligned. The entry may also indicate that no empty spaces are positioned between compressed frames CF1-CF4 in memory 110 other than that may be needed to accommodate cache line alignment of the compressed frames.

Figure 4:
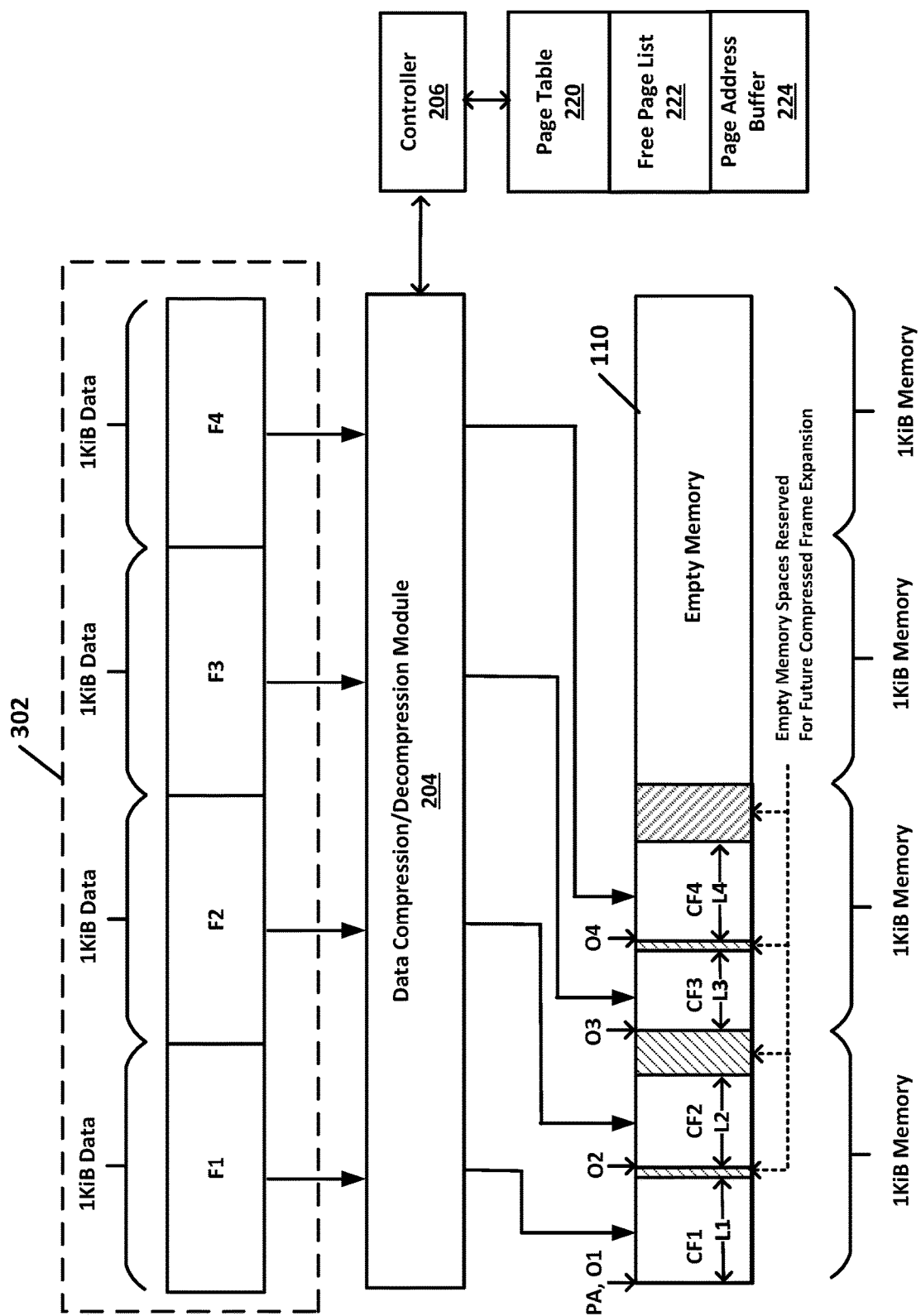
FIG. 4 is a block diagram illustrating relevant aspects of compressing a page of data according to another embodiment of the present disclosure.
Figure 5:
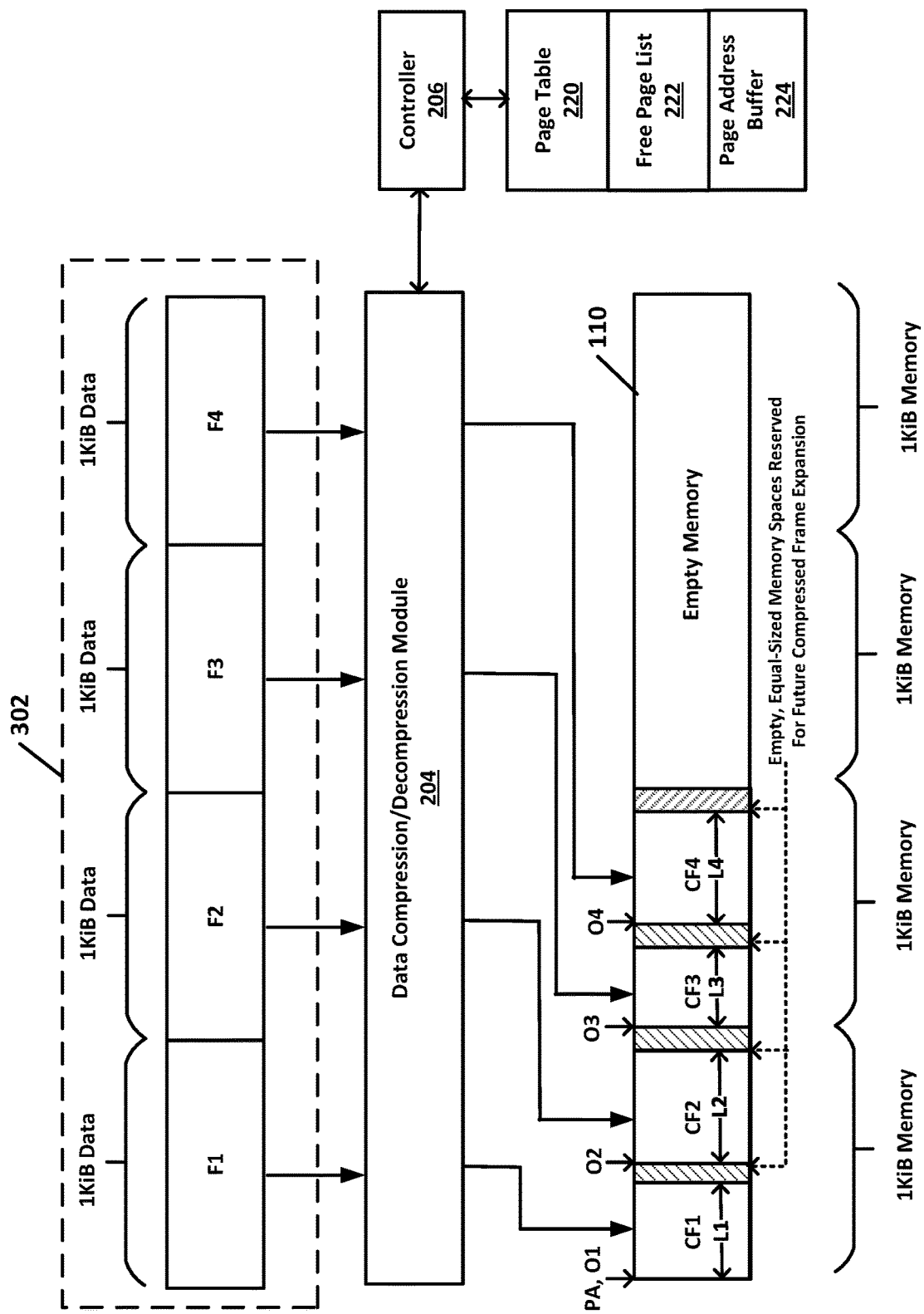
FIG. 5 is a block diagram illustrating relevant aspects of compressing a page of data according to still another embodiment of the present disclosure.

To enable low-latency recompression of a page in page cache 202 with write updates to a portion thereof, each compressed page frame can be stored in memory 110 with an adjacent empty expansion memory space that enables the expansion of a corresponding write-updated page frame when it is recompressed. FIGS. 4 and 5 illustrate operational aspects of compressing a page of data according to alternative embodiments of the present disclosure. C/D module 204 receives and concurrently compresses equally sized frames F1-F4. Again, for purposes of explanation only, it will be presumed that compressed pages will fit inside two 1 KiB memory slots. Most probably, two 1 KiB slots of memory will exceed the amount of total memory needed to store compressed frames CF1-CF4. The excess or unused portion of the two 1KiB slots can be distributed as empty memory spaces (i.e., expansion spaces) between compressed frames in memory 110.

Before compressed frames CF1-CF4 are stored in memory 110, their data lengths L1-L4 can be added by controller 206 or C/D module 304 to calculate the size S of memory needed to store compressed page 302. This calculated size S is subtracted from 2 KiB, the total size of two adjacent memory slots, to yield a quantity Q of memory space that would be stranded if compressed frames CF1-CF were stored contiguously. Controller 206 uses Q to determine sizes of expansion spaces to be inserted between adjacent compressed frames CF1-CF4. Once the sizes are calculated, compressed frames CF1-CF4 are stored in memory 110 with the expansion spaces between them. The expansion spaces can be cache line aligned in memory 110 to simplify entries in page table 220. FIGS. 4 and 5 show empty expansion spaces positioned adjacent respective compressed frames CF1-CF4. The expansion spaces are unequal in size in FIG. 4. The expansion spaces are equal in size in FIG. 5.

Controller 206 can create an entry in page table 220 for the compressed frames CF1-CF4. The page table entries for the embodiments of FIGS. 4 and 5 may differ. In one embodiment, the page table entry created by controller 206 in FIG. 4 may include the starting address PA for the set of compressed frames CF1-CF4. In addition, the newly created page table entry may include the offsets O1-O4 from the starting address PA for each of the compressed frames CF1-CF4, respectively, and data lengths L1-L4 for compressed frames CF1-CF4, respectively. Offset O1 is presumed to be zero. The newly created page table entry may also include offset address and length of each empty expansion space adjacent to a compressed frame. The lengths or the empty expansion spaces may be unequal. Lastly, the newly created entry should include an indication that the page is stored in memory in compressed format. In the embodiment shown in FIG. 5, the page table entry created by controller 206 may include the starting address PA. In addition, the page table entry may include the offsets O1-O4 for the compressed frames CF1-CF4, respectively, and the data lengths L1-L4, respectively. Offset address O1 is presumed to be zero. Table entry may also include the length of the equally sized empty expansion spaces that are adjacent to the compressed frames CF1-CF4. Again, offsets 01-04, lengths L1-14, lengths of empty expansion spaces, etc., can be stored as metadata, compressed or uncompressed, in memory 110 along with the compressed frames CF1-CF4.

Figure 6:
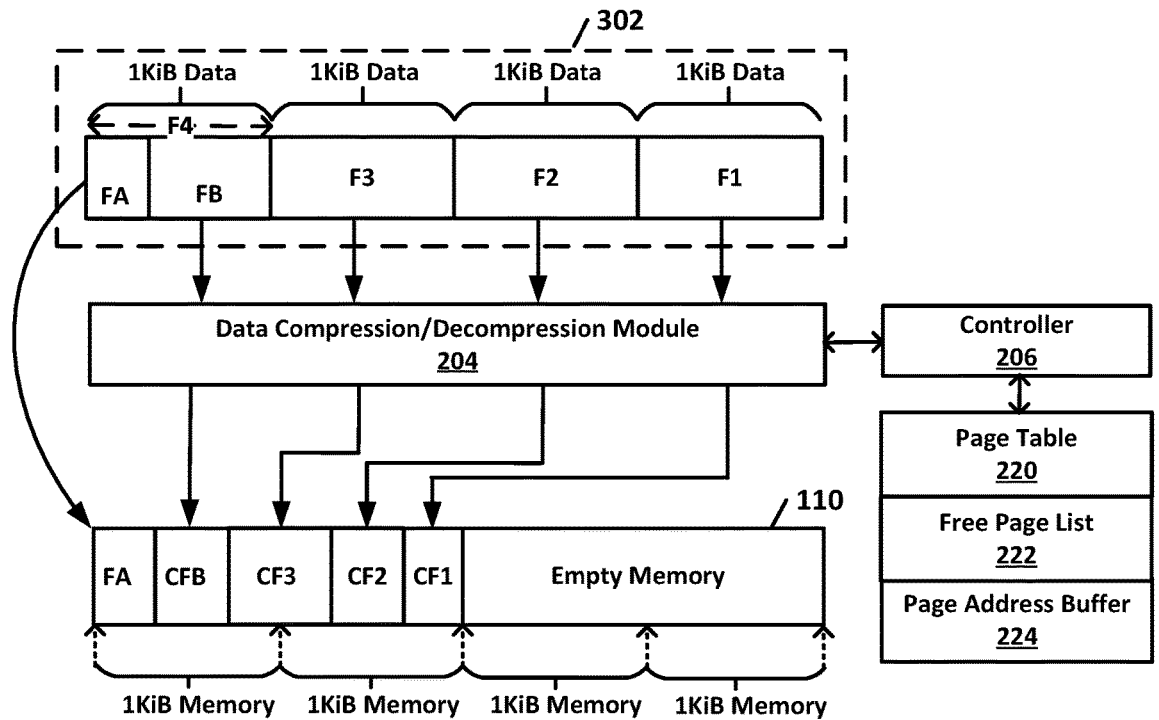
FIG. 6 is a block diagram illustrating relevant aspects of compressing a page of data according to yet another embodiment of the present disclosure.

FIGS. 3-5 illustrates embodiments in which page 302 is compressed in its entirety and stored in memory 110. In an alternative embodiment, a page can be partially compressed and stored in memory 110 alongside a portion of the page that is not compressed. FIGS. 5 and 6 illustrate operational aspects of compressing a page of data according to two other embodiments of the present disclosure. In both these embodiments, controller 206 stores compressed and uncompressed data of page 302 in memory 110.

Figure 7:
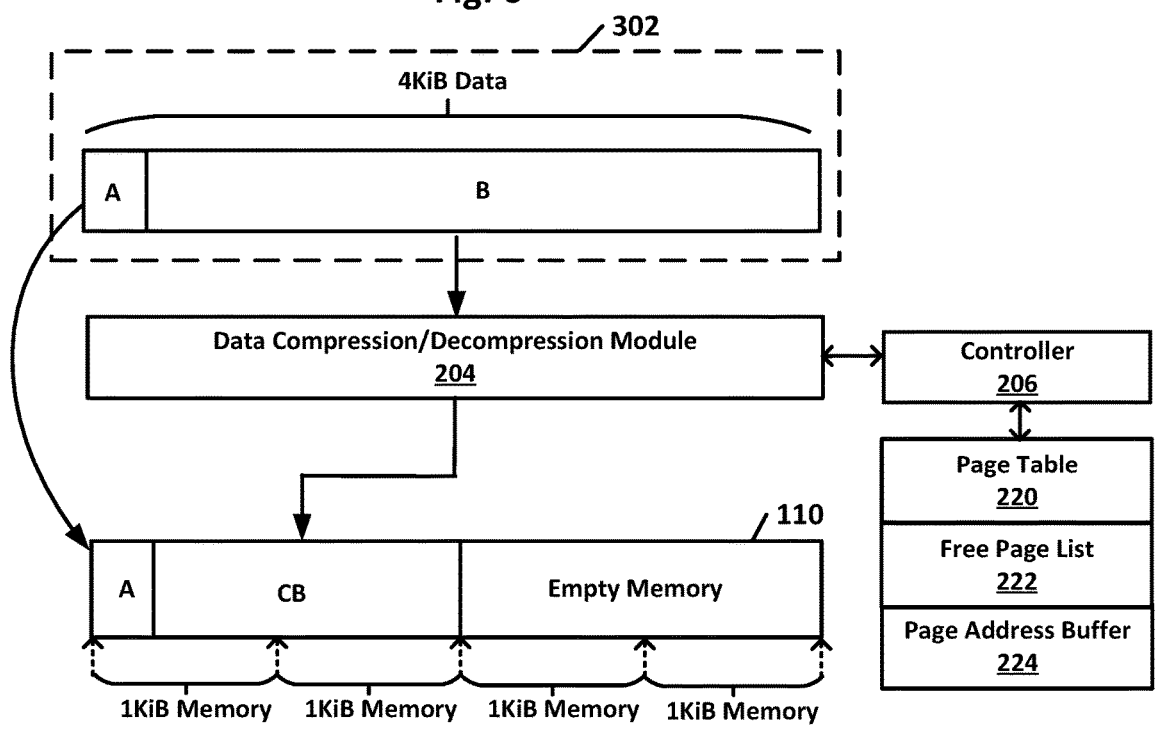
FIG. 7 is a block diagram illustrating relevant aspects of compressing a page of data according to one more embodiment of the present disclosure.

FIGS. 6 and 7 illustrate alternative embodiments in which a page is partially compressed and stored in a pair of 1 KiB memory slots. In each of these embodiments controller 206 may track the amount of memory needed to store compressed data of page 302 as it is being compressed by C/D module 204. When the amount of memory space left to fill a 1 KiB slot with compressed data equals the amount of data within the page that remains to be compressed, controller 206 stops C/D module 204's compression process. The remaining uncompressed page data is stored in the space left in the memory slot along side the compressed data. In doing so, the page can be stored in memory with compressed and uncompressed portions.

In FIG. 6 page 302 is divided into equally sized frames F1-F4. In this embodiment, some, but not all frames are compressed in parallel. For example, frames F1-F3 are compressed in parallel and stored contiguously in memory 110, or the compressed frames can be stored in cache line alignment, which should reduce their index or offset size in the page table 220. Controller 206 calculates the amount of space S remaining in the KiB slots of memory 110 to store additional compressed or uncompressed data of frame F4. Then C/D module 204 begins compressing and storing the remaining frame(s) (i.e., frame F4 in the example). Controller 206 tracks the amount of free space remaining in the 1 KiB slots of memory 110 as space S is being filled up with compressed data of frame F4. Controller 206 tracks the amount of memory needed to store compressed data of frame F4 as it is being compressed, and compares the tracked amount with the amount of space remaining in the two 1 KiB slots. If and when the amount of uncompressed data of frame F4 equals the tracked remaining space, controller 206 stops C/D module 204's compression process of frame F4. In doing so, a portion (e.g., FB) of frame F4 is compressed and stored in memory 110 while a remaining portion (e.g., FA) is not compressed and stored in memory 110. Compressed frames CF1-CF3, compressed portion CFP, and uncompressed portion FA are stored contiguously in memory 110 as shown in FIG. 6. Some empty memory space may be positioned between compressed frames CF1-CF3, CFB, and uncompressed FA to accommodate cache line alignment for these components, which in turn simplifies their offsets stored in the entry of table 220 for page 302. In this example embodiment the last three frames F1-F3 are compressed in parallel before frame F4. In alternative embodiment, frames F4-F2 are compressed in parallel before compression of frame F1.

In FIG. 7, page 302 is not segmented into frames. Data within page 302 is compressed sequentially from the beginning to the end or from the end to the beginning. For purpose of explanation, FIG. 7 will be described with reference to compressing sequentially from the end to the beginning of page 302. C/D module 204 sequentially compresses and stores data in memory 110. Controller 206 tracks the amount of free space remaining in the allocated 1KiB slots of memory 110 as it is being filled up with compressed data. If and when the tracked amount equals the data to be compressed (i.e., portion A), controller 206 stops C/D module 204's compression process. In doing so, a portion (e.g., B) of page 302 is compressed and stored in memory 110 while a remaining portion (e.g., A) is not compressed and stored in memory 110. Compressed data CB, and uncompressed data A are stored contiguously in memory 110 as shown in FIG. 7. Some empty space may be positioned between the two to accommodate cache line alignment for A and CB in memory 110, which in turn simplifies their offsets stored in an entry of table 220 for page 302.

Figure 8:
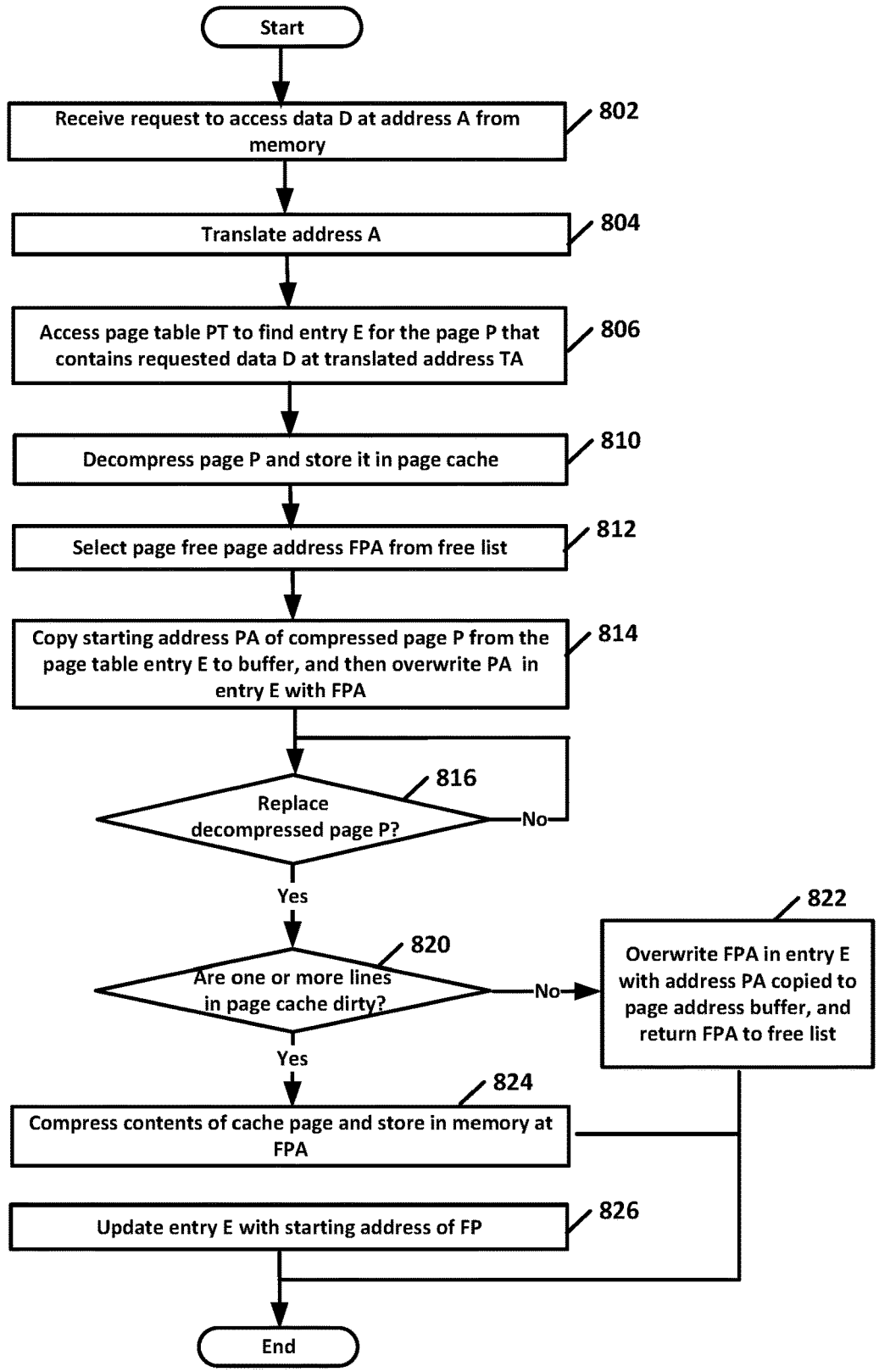
FIG. 8 is a flowchart illustrating relevant aspects of decompressing a page stored in cache memory according to one embodiment of the present disclosure.

C/D module 204 and controller 206 acting in concert can decompress a wholly or a partially compressed page stored in memory 110. FIG. 8 is a flowchart illustrating relevant aspects of one embodiment for decompressing a page. With continuing reference to FIGS. 2 and 3, the method begins at step 802 when memory buffer device 106 receives a data access request, which includes an address A for needed data D by host 102. At step 804 address A is translated. Page table 220 is accessed by controller 206 in step 806 using translated address TA. More specifically, controller 206 walks through page table 220 using translated address TA to find an entry E for a page P in memory 110 that contains the requested data D. Controller 206 can use the translated address TA and offsets O1-O4 of the entry E to identify a compressed frame of page P, which contains a 64B data cache line, which in turn contains the requested data. In step 810 C/D module 204 decompresses page P, and the decompressed page P is subsequently stored in page cache 202. Decompression may start with the compressed frame of page P that contains the requested data D. The decompressed frame may be added to cache 202 before the other decompressed frames of page P. When added to cache 202, the request received in step 902 can be answered. Rather than storing decompressed page P in cache 202, C/D module 204 can decompress page P and store it back to memory 110 at a different address for subsequent access to retrieve data D. In this alternative embodiment, eviction of decompressed page P can be avoided.

C/D module 204 and controller 206 acting in concert can recompress a page in cache 202 during a page swap. To that end controller 206 in step 812 accesses free page list 222 to read an address FPA of a free page in memory 110 that can store a recompressed page for reasons more fully described below. Again, for the purposes of explanation only, it will be presumed that recompressed page can fit within two 1 KiB slots in memory 110. Free page list 222 includes a list of starting addresses of adjacent, empty slots in memory 110. In step 814 controller 206 copies the starting address PA in the entry E found in step 806 to page address buffer 224, and then controller 206 replaces PA in entry E with the FPA that was selected in step 812.

During the page swap, decompressed page P stored cache 202 can be replaced by a new decompressed page of data. Before that happens controller 206 checks cache 202's table to see if any of the cache lines of decompressed page P are dirty as a result of being modified while held in page cache 202 as shown in step 820. If none of the cache lines are dirty, page P in cache 202 need not be recompressed before it is effectively returned to memory 110, and as a result controller 206 overwrites FPA held in entry E with the starting address PA that was stored in buffer 224 in step 812, and the process ends without having to go through the time-consuming and complicated process of recompressing data. If, however, controller 206 in step 820 determines that one or more cache lines are dirty, then the contents of page P in cache 202 are compressed and stored in memory 110 beginning at address FPA that was selected in step 810.

Figure 9:
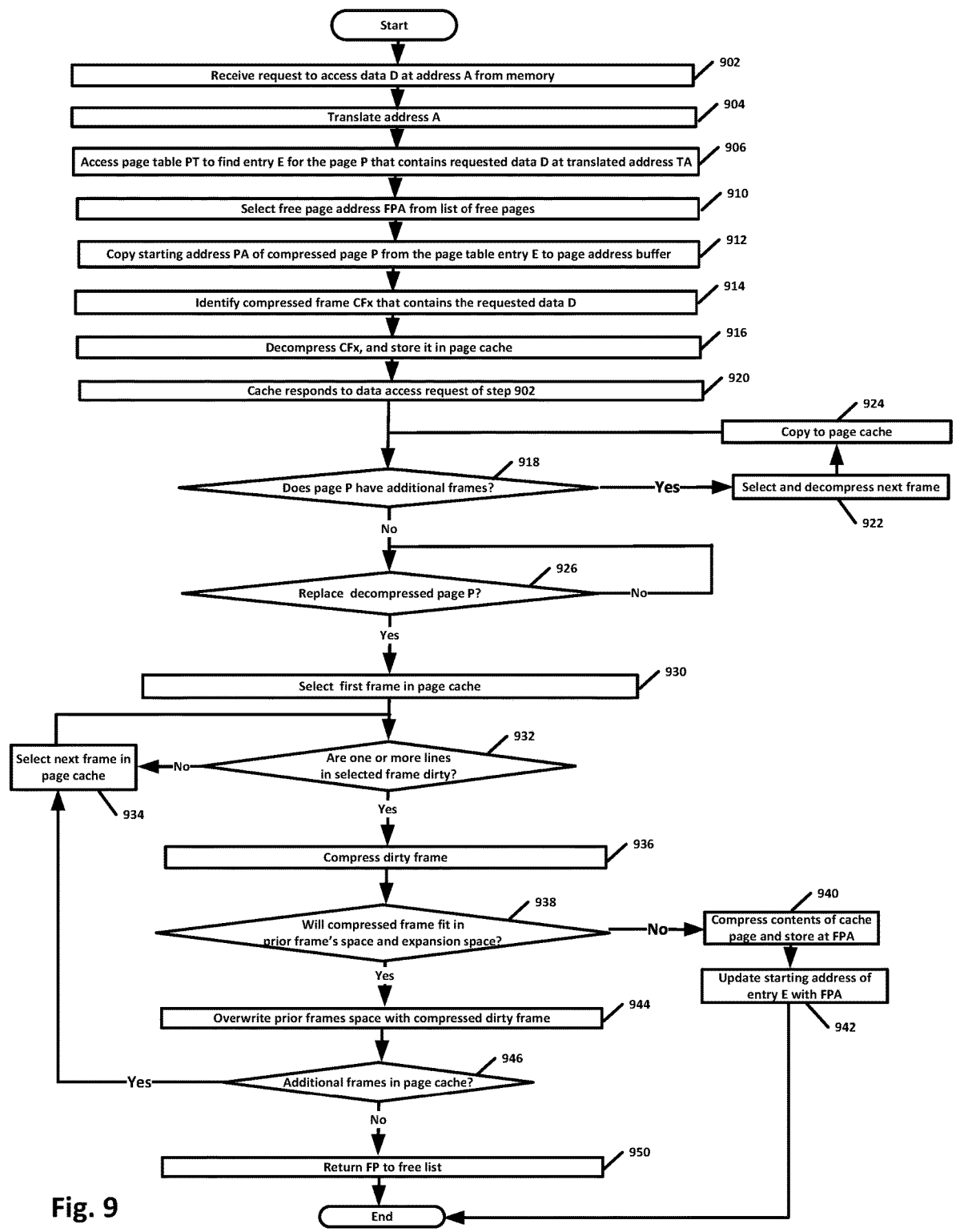
FIG. 9 is a flowchart illustrating relevant aspects of decompressing a page stored in cache memory according to another embodiment of the present disclosure.

FIG. 8 shows a process for recompressing all of page stored in cache 220 regardless of whether one or many cache lines are dirty. The time needed to recompress an entire page is greater than the time needed to recompress a frame thereof. FIG. 9 illustrates an alternative embodiment in which only dirty frames in page cache 202 are recompressed prior to returning (i.e., flushing) the page back to memory 110. With continuing reference to FIGS. 2-5, the process of FIG. 9 begins at step 902 when memory buffer device 106 receives a data access request, which includes an address A for the data D needed by host 102. At step 904 the address A of the access request is translated. Page table 220 is accessed by controller 206 in step 906 using the translated address TA. More specifically, using translated address TA controller 206 can walk through entries of page table 222 to find an entry E for a page in memory 110 that contains the requested data D. In step 910 controller 206 accesses free page list 222 to read an address FPA of a free page in memory 110 that can store a recompressed page. In step 912 controller 206 copies the starting address PA from the entry E found in step 906 to page address buffer 224, and then controller 206 replaces PA in entry E with the FPA that was selected in step 910. Controller 206 can use the translated address TA and offsets O1-O4 of the entry E to identify the compressed frame CFx of page P, which contains a 64B data cache line, which in turn contains the requested data D. In step 916 C/D module 204 decompresses CFx, and the decompressed page frame is subsequently stored in page cache 202. In step 920 cache 210 response to the request of step 902 by providing requested data D to host 102.

C/D module 204 can decompress the remaining frames of compressed page P. In step 918 controller 206 determines whether additional frames of page P need to be decompressed. If so, then in steps 922 and 924 the next compressed frame of page P is decompressed and copied to page cache 202. Eventually, all frames CF1-CF4 of page P are decompressed and stored in page cache 202.

Eventually page P in cache 202 may be returned (i.e., flushed) to memory 110 and replaced with a new page. Page P could be returned to memory 110 without recompression in one embodiment even if one of the page frames in cache 202 is dirty. However, the present disclosure will be described with reference to recompressing dirty frames before they are returned to memory 100. One or more frames in page cache 202 may not be dirty. Those frames need not be recompressed before they are returned to memory 110. The process for returning page P to memory 110 starts in step 930 in which the first frame F1 in cache 202 is selected by controller 206. The cache page table is checked in step 932 to see if any one or more of the cache lines of the selected frame are dirty. If none of the cache lines are dirty, there is no reason to recompress the selected frame since the frame exists in memory 110 in compressed format, and accordingly the next frame in page cache 202 is selected in step 934. If, however, the selected frame contains dirty cache lines, C/D module 204 recompresses the selected, dirty frame in step 936. The prior compressed version of that frame in memory 110 can be overwritten with the recompressed dirty frame if the prior compressed version occupies a space in memory 110 equal to or less than the space needed to store the recompressed dirty frame. Or the prior compressed version and its adjacent expansion space in memory 110 can be overwritten with the recompressed dirty frame if the size of the prior compressed version and adjacent expansion space in memory 110 is equal to or less than the size needed to store the recompressed dirty frame. In step 938 controller 206 uses information contained within entry E identified in step 906, to determine whether the prior compressed version (and optionally its adjacent expansion space) provides enough room to store the recompressed dirty frame. Specifically, controller 206 compares the length L of the prior compressed version (and optionally the length of its adjacent expansion space) with the length of the recompressed dirty frame. If the compressed dirty frame is small enough, the prior compressed version is overwritten in step 944, and controller 206 updates entry E with the new length of the recompressed dirty frame (and optionally a new length of the adjacent expansion space). In step 946 controller 206 checks to see whether additional frames exist in cache 202. If additional frames exist, the next frame is selected in step 934, and steps 932 through 944 are repeated. It is noted, however, that if controller 206 determines that a recompressed dirty frame will not fit in the memory space occupied by the prior compressed version (and optionally its adjacent expansion space), then in steps 940 and 942 all frames of page P are compressed and stored at the FPA address selected in step 910. Alternatively, page p can be stored uncompressed in memory 110 at the FPA address.

The description of illustrated embodiments of the disclosure, including what is described in the Abstract, is not intended to be exhaustive or to limit the disclosure to the precise forms disclosed. While specific embodiments of, and examples for, the disclosure are described herein for illustrative purposes, various equivalent modifications are possible within the scope of the disclosure, as those skilled in the relevant art will recognize.

Various operations are described as multiple discrete operations, in turn, in a manner that is most helpful in understanding the present disclosure, however, the order of description should not be construed to imply that these operations are necessarily order dependent. These operations need not be performed in the order of presentation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

What is claimed is:

1. A memory buffer integrated circuit (IC) device comprising:
   a first circuit configured to independently compress equally sized portions of a page of data;
   a second circuit configured to store the compressed data portions at respective addresses in memory, and;
   a third circuit configured to store a page table comprising an entry with information related to the respective memory addresses.

2. The memory buffer IC of claim 1 wherein the second circuit is configured to store the compressed data portions in memory with unused memory portions between the compressed data portions.

3. The memory buffer IC of claim 2 wherein the unused memory portions are equal in size.

4. The memory buffer IC of claim 2 wherein the unused memory portions are unequal in size.

5. The memory buffer IC of claim 1 further comprising a fourth circuit configured to store the page of data.

6. A method comprising:
   independently compressing equally sized portions of a page of data;
   storing the compressed data portions at respective addresses in memory;
   creating a table, wherein the table comprises a plurality of entries, a first of which comprises information related to the addresses in memory where the compressed data portions are respectively stored.

7. The method of claim 6 wherein the compressed data portions are stored with unused memory portions between them.

8. The method of claim 7 wherein the unused memory portions are equal in size.

9. The method of claim 7 wherein the unused memory portions are unequal in size.

10. The method of claim 6 further comprising:
    receiving a request to access first data of the data page, wherein the request comprises a data address;
    decompressing the compressed data portions after receiving the request;
    storing the decompressed data portions in a fourth circuit configured to store data;
    accessing the first data in the fourth circuit.

11. The method of claim 10 further comprising:
    in response to receiving the request, accessing the table using the data address to read the information related to the addresses in memory where the compressed data portions are stored;
    accessing the compressed data portions using the information related to the addresses in memory where the compressed data portions are stored;
    wherein the compressed data portions are decompressed in response to accessing the table.

12. The method of claim 10 wherein the decompressed data portions are stored in the fourth circuit, starting with the decompressed data portion that comprises the first data.

13. The method of claim 10 wherein storing the compressed data portions comprises:

storing a first of the compressed data portion in memory at a first address;

storing the remaining compressed data portions in memory after the first compressed data portion is stored in memory;

wherein the method further comprises:

storing the first address in the first entry of the table;

copying the first address to buffer memory:

selecting a new first address in memory from a list of free addresses;

overwriting the first address in the first entry with the new first address;

after overwriting the first address in the first entry with the new first address, overwriting the new first address in the first entry with the first address copied to the buffer memory if the decompressed data portions held in the fourth circuit have not been modified;

after overwriting the first address in the first entry with the new first address, recompressing the decompressed data portions held in the fourth circuit, and storing the recompressed data portions in memory if one or more of the decompressed data portions held in the fourth circuit have been modified;

wherein storing the recompressed data portions comprises storing a first of the recompressed data portions at the new first address;

storing the remaining recompressed data portions in memory after the first recompressed data portion is stored.

14. The method of claim 10 further comprising:

recompressing those decompressed data portions in the fourth circuit, which have been modified;

replacing the compressed data portions in memory with the recompressed data portions, respectively, if the recompressed data portions can fit in memory spaces, respectively, that are occupied by the respective decompressed data portions;

storing the recompressed data portions at respective new addresses in memory if the recompressed data portions cannot fit in the memory spaces, respectively, that are occupied by the decompressed data portions, respectively.

15. A memory buffer integrated circuit (IC) device comprising:

a first circuit configured to compress some but not all of a page of data;

a second circuit configured to store the compressed data of the page in memory uncompressed data of the page in the memory; and a third circuit configured to store a page table comprising an entry with information related to the memory addresses where the compressed, equally sized data portions are stored.

16. The memory buffer IC of claim 15:

wherein the first circuit is configured to independently compress equally sized portions of the page of data;

wherein the second circuit is configured to store the compressed, equally sized data portions at respective addresses in memory.

17. The memory buffer IC of claim 16 further comprising:

a fourth circuit configured to store data;

wherein the first circuit is configured to receive a request to access first data of the data page, wherein the request comprises a data address;

wherein the first circuit is configured to access the table using the data address and read the information related to the addresses in memory where the compressed data portions are stored;

wherein the second circuit is configured to decompress the compressed data portions;

wherein the first circuit is configured to store the decompressed data portions in the fourth circuit;

wherein the first circuit is configured to store the uncompressed data in the fourth circuit.

18. The memory buffer IC of claim 16:

wherein the first circuit is configured to independently compress some but not all of another equally sized portion of the page of data after the first circuit compresses the equally sized portions of the page of data;

wherein the second circuit is configured to store the compressed some but not all of the other equally sized data portion in memory.

19. The memory buffer IC of claim 15:

wherein the page includes a first portion and a second portion;

wherein the first circuit is configured to sequentially compress and store the first portion in memory;

wherein the first circuit is configured to store the second portion as uncompressed data in memory.

* * * * *